United States Patent [19]
Valyi

[11] 4,242,300
[45] * Dec. 30, 1980

[54] METHOD FOR PROCESSING PARISONS

[76] Inventor: Emery I. Valyi, 5200 Sycamore Ave., Riverdale, N.Y. 10471

[ * ] Notice: The portion of the term of this patent subsequent to Apr. 24, 1996, has been disclaimed.

[21] Appl. No.: 968,681

[22] Filed: Dec. 12, 1978

Related U.S. Application Data

[60] Continuation-in-part of Ser. No. 911,359, Jun. 1, 1978, which is a continuation-in-part of Ser. No. 641,638, Dec. 17, 1975, abandoned, which is a division of Ser. No. 479,287, Jun. 14, 1974, Pat. No. 3,970,419, which is a continuation-in-part of Ser. No. 473,580, May 24, 1974, Pat. No. 3,966,378.

[51] Int. Cl.$^3$ ............................................. B29C 17/07
[52] U.S. Cl. ................................... 264/520; 264/521; 264/532; 264/537; 425/526; 425/533
[58] Field of Search ............... 264/520, 521, 523, 537, 264/538, 530, 532; 425/526, 533, 530

[56] References Cited

U.S. PATENT DOCUMENTS

| | | | |
|---|---|---|---|
| 2,262,612 | 11/1941 | Kopitke | 264/537 |
| 3,776,991 | 12/1973 | Marcus | 264/538 X |
| 3,944,643 | 3/1976 | Sato et al. | 264/532 |
| 3,979,491 | 9/1976 | Zavasnik | 425/533 X |
| 4,044,086 | 8/1977 | McChesney et al. | 264/537 X |
| 4,151,247 | 4/1979 | Hafele | 425/533 X |

*Primary Examiner*—Jan H. Silbaugh
*Attorney, Agent, or Firm*—Bachman and LaPointe

[57] ABSTRACT

Disclosure teaches a method for rapid processing parisons, especially a method for maintaining a relatively elevated inside temperature of said parison at the time of its removal from the parison mold characterized by removing the core from the parison while confining it on its outside and while maintaining a positive fluid pressure on the inside of the parison whereby a neck mold may be kept in engagement with the parison.

13 Claims, 4 Drawing Figures

METHOD FOR PROCESSING PARISONS

CROSS-REFERENCE TO RELATED APPLICATIONS

This application is a continuation-in-part of copending application Ser. No. 911,359, filed June 1, 1978, which in turn is a continuation-in-part of Ser. No. 641,638, filed Dec. 17, 1975, now abandoned, which in turn is a divisional of Ser. No. 479,287, filed June 14, 1974, now U.S. Pat. No. 3,970,419, which in turn is a continuation-in-part of Ser. No. 473,580, filed May 24, 1974, now U.S. Pat. No. 3,966,378.

BACKGROUND OF THE INVENTION

This invention relates to the art of molding articles of organic plastic material from a parison, particularly under conditions imparting multi-axial orientation, and has for its principal objects the improved adjustment of the temperature of the parison, facilitating the transfer of the parison from one mold to another, and the provision of improved, oriented hollow articles.

The art teaches various methods and apparatus for obtaining blow molded articles of organic plastic material from a pressure molded parison, such as in U.S. Pat. No. 3,349,155 and U.S. Pat. No. Re. 27,104. Generally these methods are characterized by forming a parison in a parison mold on a blow core, placing said formed parison and blow core into a blow mold and expanding said parison in the blow mold by means of fluid pressure.

While the blow molding operation tends to impart orientation to the article, the degree and type of such orientation is difficult to control and therefore it is difficult to obtain the advantageous properties in the article that multi-axial orientation is capable of providing if said orientation is carried out under the most desirable conditions of temperature distribution by stretching and circumferentially expanding said parison.

It is known that the control or orientation depends largely upon the control of the temperature of the parison just prior to orientation. It is found that such temperature control is best obtained by enclosing the parison prior to the orienting step in an environment, such as a heater or a mold whose surfaces may provide conductive or radiant heat transfer to the corresponding surfaces of the parison.

Plastic articles exhibiting the properties of multi-axial orientation, e.g., bottles and other hollow containers, are frequently made in two stages. The first of these two stages is the production of the parison usually by injection molding, or by other pressure molding procedures such as compression molding and extrusion. The first stage thus serves to convert the chosen plastic into a parison of predetermined shape, having a wall thickness distribution suitable for the production of the final article shape and usually also having a neck or rim configuration suitable to receive a closure appropriate for the said article. If injection molded, the parison is removed from the injection mold typically consisting of a mold cavity, a core and a neck (or rim) mold, by extracting it from the mold cavity, by extracting the core therefrom and, either before or after its transformation into the finished article, by releasing it from the neck mold. All of these steps and procedures are well known in the injection molding art. The parison so produced is relatively cold, having a temperature substantially below that required for successful orientation, the reason being that the said parison could otherwise not be extracted from the mold cavity nor separated from the core without significant damage to its dimensions. If the outer surface of the parison is at an elevated temperature, it tends to adhere to the mold cavity and deform in the course of extraction. If the inner surface is not cold enough, it will adhere to the core. Moreover, when extracting the core, vacuum is created in the space within the parison from which the core is extracted and therefore the parison must be strong enough not to deform under the influence of the ambient atmospheric pressure acting upon the outside thereof. In order for the parison to attain the requisite strength, it must be cooled well below that temperature at which it is desirable to form it into the finished article.

The parison so made is next subjected to a second stage of operations wherein it is heated to that temperature at which its transformation into the finished article is to take place and, once at that temperature, it is expanded under conditions imparting the desired orientation.

Such two-stage operations are well known in the art. For example, in a machine designated as RHB 5 built by the Cincinnati-Milacron Company, conventional parisons that have been previously injection molded in a conventional manner are passed through parallel banks of infrared heaters, usually while being rotated around their axes to insure improved heating and, upon reaching the desired temperature, placed into a blow mold in which a stretch mandrel extends the length of the parison to a predetermined degree, followed by expanding the extended parison into conformance with the blow mold by means of a pressure fluid. Other similarly acting devices are well known and described, e.g., in the February and March, 1976 issues of *Modern Plastics* (a McGraw-Hill Publication). One such device is known as the Model 650 Machine built by Nissei Plastics Industrial Co., Ltd. of Japan, a schematic description of which is given in U.S. Pat. No. 3,944,643 and U.S. Pat. No. 4,105,391. In that machine, the parison is injection molded and cooled in the injection mold which includes a core, to a temperature at which it is easily removed from said core (according to claim 1 of the above U.S. Pat. No. 3,944,643). The parison is then transferred by means of a neck mold to a heating environment designated as a reheating mold (claim 1) or heating device (Column 1, line 6), in which its temperature is raised to that desired for orientation, by means of external and, if found necessary, also internal heaters which may be of the radiant or contacting type. Once the parison reaches the desired temperature, it is transferred to a blow mold in which it is converted into the finished article by stretching and blowing, as above described in connection with the RHB 5 Machine.

The disadvantages of such two-stage operations include a slow cycle due to the fact that the parison must first be cooled from the temperature at which it is molded to near room temperature, only to be heated once more to the relatively high orientation temperature, with a corresponding waste of heat. In addition, heating of the parison is unsatisfactory because, it being made of an organic polymer and hence a poor heat conductor, uniform heating across its wall thickness is very difficult and time consuming to obtain.

In addition to the above two-stage procedures, a single stage operation may be employed, wherein the parison is cooled after having been molded only enough to lower its average temperature substantially to that chosen for orientation and the transformation of the parison into the finished article is carried out, for example, by stretching and blowing, after it has attained a uniform cross-sectional temperature distribution corresponding to the above average temperature, preferably in a tempering mold. Such single stage operation is described in my previous U.S. Pat. No. 3,966,378 according to which the parison is injection or compression molded, cooled to a predetermined, limited degree in the injection or compression mold, transferred by means of the injection core into a tempering mold for equalization of its temperature distribution and then transferred onto a stretch mandrel and into a blow mold for finishing of the final article. While such single stage operation lacks the disadvantages of excessive operating cycle, waste of heat and non-uniform temperature distribution at the time of orientation, it can benefit from improvement at the transfer of the parison into the tempering environment or mold.

SUMMARY OF THE INVENTION

In accordance with the present invention, a method is provided for accelerating the temperature adjustment of a parison, particularly a parison used in a two-stage process, prior to its transformation into a finished article by multi-axial expansion. The respective improvements of the operating cycle, of heat-energy utilization and of the processing and mechanical product quality comprise: providing a mold assembly including a parison mold cavity, a core and a neck mold, all in communication with a source of hot molten plastic under pressure, providing a parison within said assembly, cooling said parison after its formation by contact with said mold cavity, core and neck mold, continuing said contact with said core only for a relatively short time which is less than the time of contact with the said cavity, and separating said core and said parison from each other, such separation occurring at a temperature of the parison which renders the separation difficult without special means, whereby the said means comprise a channel within said core which may be closeable, said channel communicating with the inside of the parison to provide access of fluid pressure to the said inside thereby avoiding the formation of vacuum inside the parison while separating it from said core, maintaining said fluid pressure during said separation, preferably while the parison is confined in the neck mold and prevented from unduly deforming under the influence of said fluid pressure, as by being confined, as in the said mold cavity.

Therefore, the present invention relates to a method for the temperature conditioning of an organic plastic parison for the operation of multi-axial orientation such as by stretching and expanding. The improvement of the present invention comprises: retaining said parison in a first mold which includes a mold cavity and a core; separating said parison and said first mold after substantial change in the heat content of said parison will have taken place; separating said core from said parison at a time prior to the separation of said parison from said mold; separating the parison and said mold from each other; and locating the parison in an environment capable of influencing the cross-sectional temperature distribution in the walls of said parison.

In accordance with a preferred embodiment of the present invention, a method is provided for the preparation of hollow articles maintaining substantially consistent temperature control of the articles prior to orientation or prior to final expansion. In accordance with this preferred embodiment, an organic plastic parison is provided in a formable condition at a temperature substantially above that required for orientation of said plastic on a temperature controlled first core in a temperature controlled first mold, wherein the first mold and first core are held at temperatures below that required for orientation of said plastic and the first core is at a higher temperature than the first mold; altering the heat content of said parison by means of heat exchange with said first core and first mold at temperature gradients adapted for rapid heat flow with an unequal distribution of temperature resulting across the walls of the parison and with the portion of the parison adjacent the core having a higher temperature than the portion adjacent the mold, preferably with the parison having an average temperature suited for orientation; removing the core from the parison as provided hereinabove; and transferring the temperature adjusted parison for further processing.

In a particularly preferred embodiment, a first means, such as a temperature controlled second mold, is provided for retaining the resultant parison in a closed environment efficiently suitable for equalizing the temperature distribution within the walls of the parison to attain a temperature substantially corresponding to the orientation temperature of said plastic; preferably providing means capable of influencing the inside temperature of the parison, as a second core; transferring the parison from the first mold to the second mold and preferably also to the second core, such as by means of the second core or the neck mold; maintaining the parison in the second mold without substantially altering the heat content thereof for a period of time to substantially equalize the temperature distribution thereof and to provide said parison substantially at orientation temperature; transferring said parison to a blow mold; and fully expanding the parison in said blow mold.

In accordance with still another embodiment of the present invention, an organic plastic parison is provided in a formable condition at a temperature substantially above that required for orientation of said plastic in a mold assembly containing individually temperature controllable elements including a mold cavity, a core and a neck mold; altering the heat content of said parison by heat exchange with said mold assembly; interrupting said heat exchange with the said core by separating said parison and core from each other with the aid of fluid pressure applied inside said parison through said core, such separation occurring while the parison remains in heat exchange contact with said mold cavity and neck mold; separating said parison from said mold cavity, preferably by means of said neck mold after the separation of said parison from said core; and transferring said parison into an environment adapted to adjust the temperature of said parison for further processing, whereby said environment may include a second mold and said transfer may be effected by means of the neck mold or by other external means.

The process of the present invention achieves numerous significant advantages. The transfer of the parison is facilitated, with rapid transfer obtained. The core can be easily removed from the parison without inordinate cooling being required with its attendant slower processing cycle.

It can also be seen that the process of the present invention readily and expeditiously obtains temperature control of the inside and outside surfaces of the parison so that the resultant article is characterized by highly improved properties while obtaining a rapid operating cycle. Thus, one may conveniently obtain articles that are multi-axially oriented under conditions of close control. It is known that orientation substantially improves the significant properties of plastics, as clarity, impact resistance, strength, resistance to permeation, etc. Among the plastics that can be so improved are polystyrene, polyvinyl chloride, polycarbonates, polyolefins, as polyethylene and polypropylene, polyesters, polyamides, acrylics, acrylonitrile, and methacrylonitrile polymers. The improved temperature control of the present invention enables one to obtain improved properties and controlled multi-axial orientation in a simple and expeditious manner with a rapid operating cycle.

Accordingly, it is a principal object of the present invention to provide a method for the preparation of hollow articles from moldable organic plate material which enables accurate temperature control within an efficient operating cycle.

It is a further object of the present invention to provide an improved method for separating an organic plastic parison from the core upon which it is formed.

It is a further object of the present invention to conveniently and expeditiously provide improved articles which are multi-axially oriented under conditions of close control.

It is a still further object of the present invention to provide a method as aforesaid which provides products possessing reproducibly uniform properties due to orientation.

Other objects and advantages of the present invention will be apparent to those skilled in the art from the description which follows with reference to the accompanying drawings.

DETAILED DESCRIPTION OF THE PREFERRED EMBODIMENTS

Figure 1:
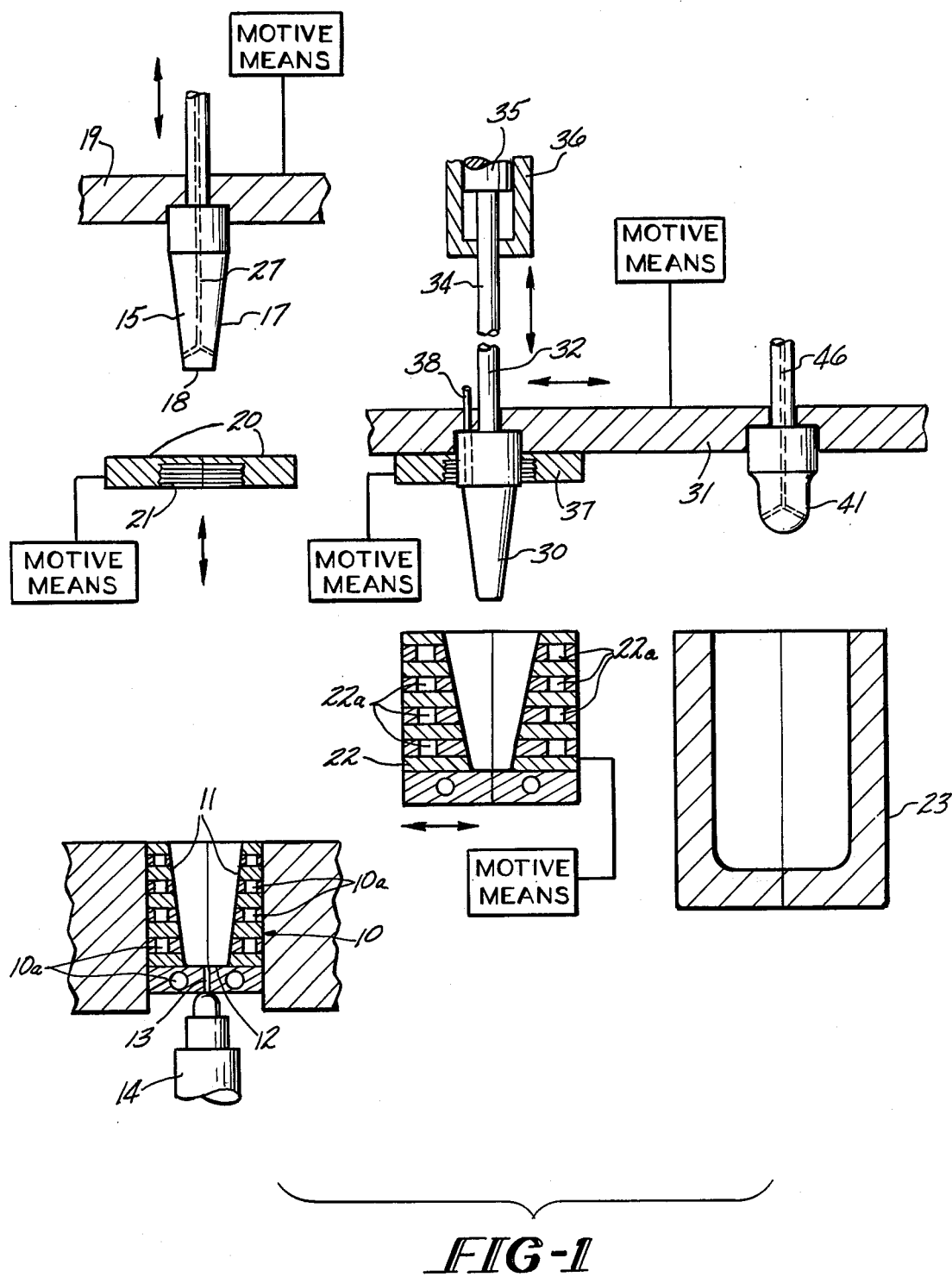
FIG. 1 is an elevation, partly in section, illustrating the method of the present invention.
Figure 2:
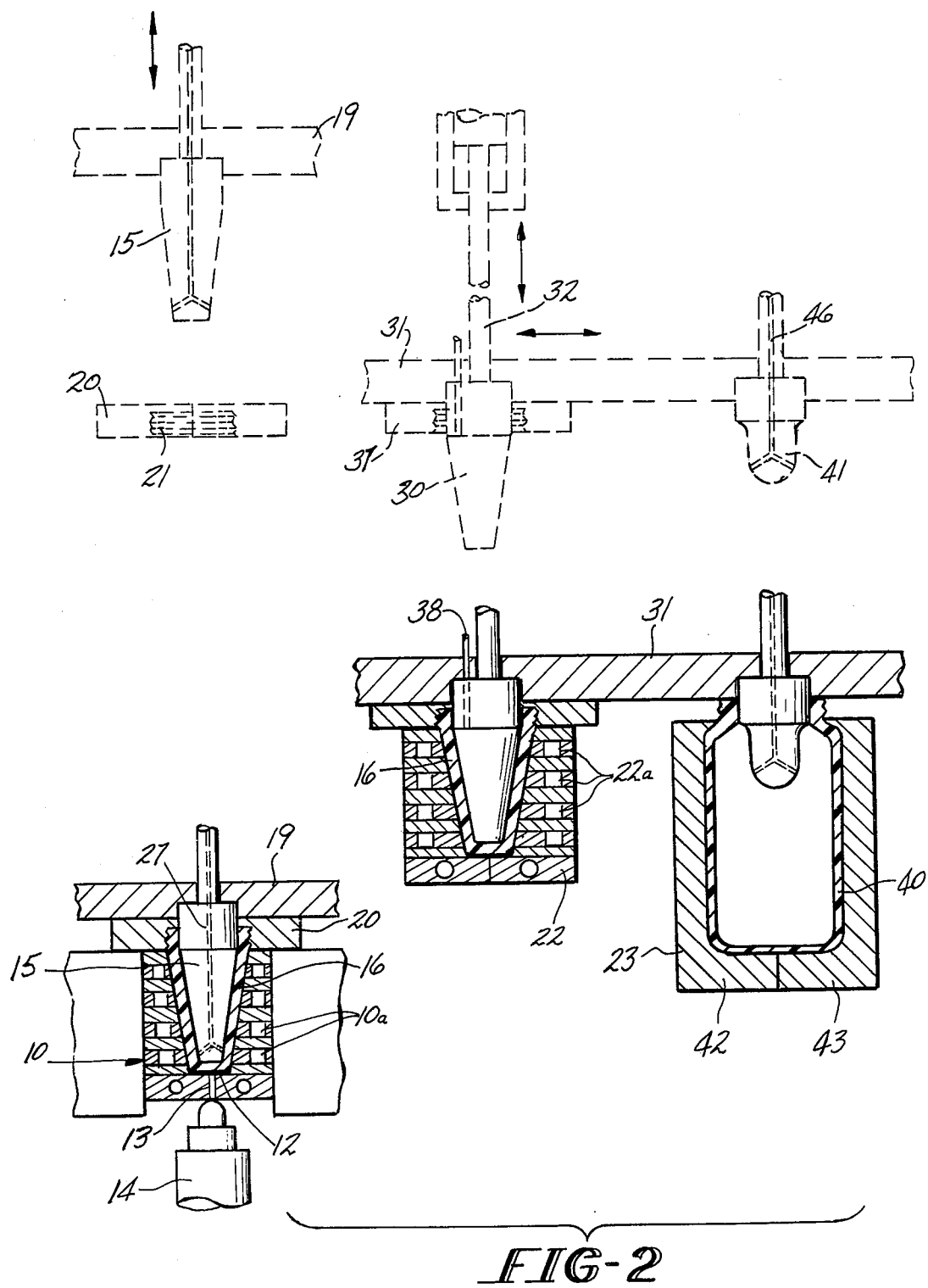
FIGS. 2 and 3 are views similar to FIG. 1 with additional portions in phantom showing a sequence of operations according to an embodiment of the present invention.
Figure 3:
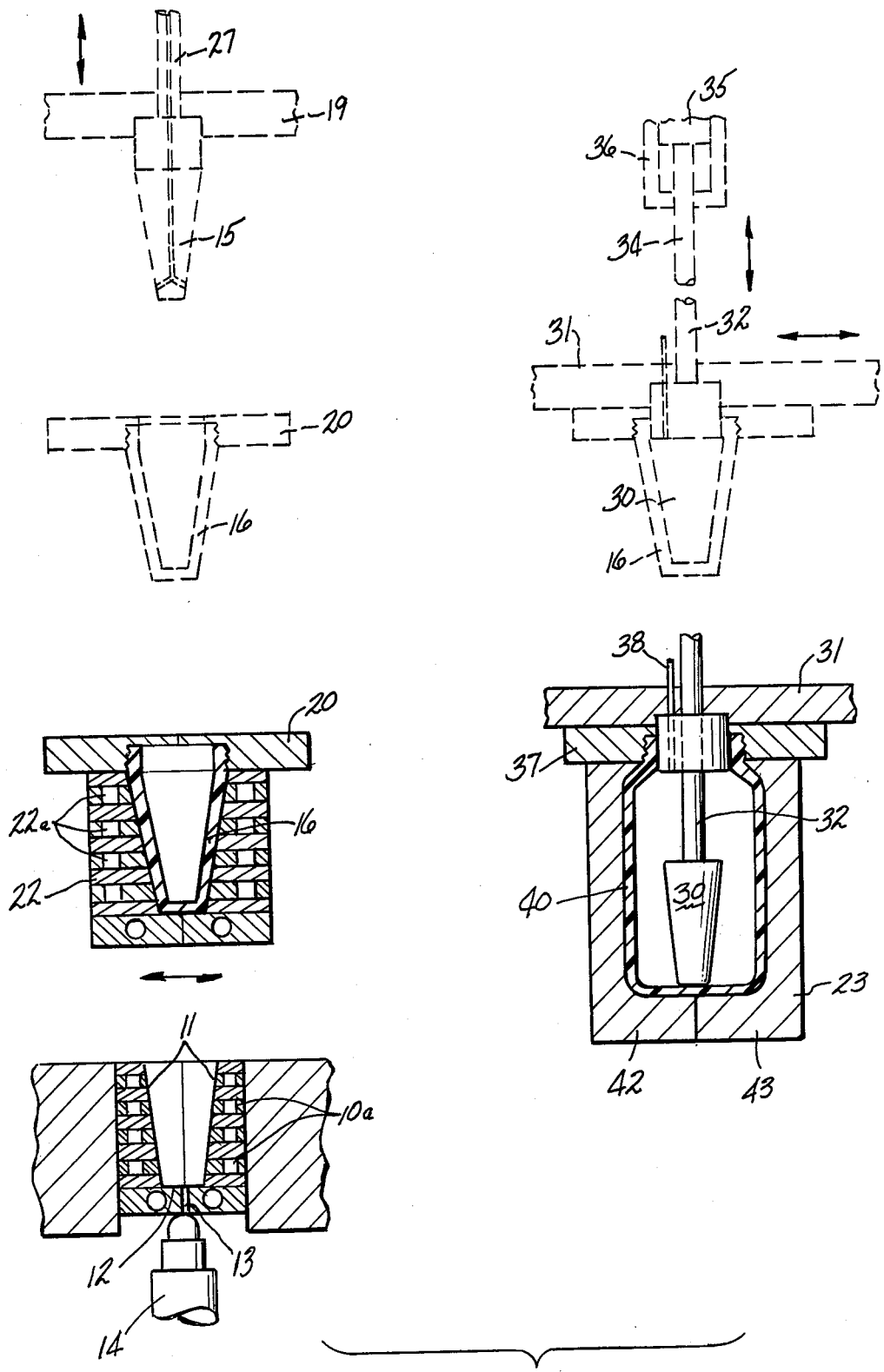

Referring to the drawings in more detail, FIGS. 1, 2 and 3 illustrate one embodiment of the present invention. In this embodiment, the parison is provided by an injection molding process; however, the invention is not limited thereto and includes other known molding processes that are capable of producing parisons such as compression molding, casting extrusion with or without secondary operation, and the like. FIG. 1 depicts a parison die 10, having outer walls 11 which may be separable, depending upon the shape of the parison and which are adapted to form the outer surface of the parison, and having an end wall 12 shaped to form the end wall of the parison. The parison die 10 may be temperature controlled, such as by heating or cooling elements 10a contained therein which are connected to appropriate heat transfer sources (not shown) whereby such temperature control may be arranged in several zones to obtain different temperatures in different regions of the parison side and end walls. The end wall 12 of the parison die has an injection opening 13 registering with an injection nozzle 14 through which the organic plastic material is injected into the parison die. The parison die 10 is shown as split for convenience in opening to release the formed parison; however, it should be understood that the invention is not limited thereto, as one-piece dies suitably designed for release of the parison are encompassed herein.

As indicated hereinabove, the plastics contemplated in accordance with the present invention are the moldable organic plastic materials and preferably those whose properties are improved by orientation, such as the polyolefins, polyethylene, polypropylene and copolymers thereof, polyvinyl chloride, polystyrene and other styrenic resins, acrylonitrile, methacrylonitrile, polyvinylidene chloride, polycarbonates, polyesters, polyamides, fluorocarbon resins, etc.

The formation of the parison in accordance with the embodiment illustrated in FIGS. 1, 2 and 3 takes place after a first core 15 illustrated in FIG. 1, and set forth in phantom in FIGS. 2-3, neck mold 20 and die 10 are brought into engagement by suitable mechanical means, such as the motive means shown schematically in FIG. 1. In the embodiment shown in FIGS. 1, 2 and 3, parison die 10 is stationary, while core 15 and neck mold 20 are axially reciprocable in the direction of the arrow into and out of engagement with die 10. It should be understood that the present invention is not limited thereto, as reciprocable parison dies and stationary cores and/or neck molds are encompassed therein. Upon completion of injection through nozzle 14, a parison 16, having substantially the configuration represented in FIG. 2, is formed.

Side wall 17 and an end 18 of core 15, walls 11 and 12 of parison die 10, and the neck mold 20 constitute a die cavity in which the parison is formed. Core 15 may be temperature controlled in one or more zones, such as by internal heat exchange circuits known in the art contained therein, which are connected to an appropriate heat transfer or power source (not shown). Core 15 is carried by platen 19. The assembly further includes a neck mold 20 in which the neck of the parison is formed and which remains engaged with the parison after core 15 is disengaged from the parison die, as will be described hereinbelow, which neck mold may be independently temperature controlled. The neck mold may possess threads 21 for defining a threaded opening in the final molded object. The neck mold 20 may be split and opened into two portions by suitable mechanical means such as the motive means shown schematically in FIG. 1, to release the parison, or, if the configuration of the neck permits, may be of one piece construction and, thus, separable from the parison as a unit, as by unscrewing.

As indicated hereinabove, the parison 16 is formed in mold 10 by injection molding as shown in FIG. 2 which is at a temperature substantially above that required for orientation. It is desirable to rapidly adjust the temperature of the parison so that a temperature suitable for orientation is obtained without inordinate delay.

In the interest of a rapid operating cycle, it is particularly advantageous to first rapidly alter the heat content of parison 16 by heat exchange with core 15 and mold 10 to result in a heat content desired for subsequent operations, but almost always at the cost of an unequal distribution of temperature in said parison. This must be followed by adjusting the temperature of the parison, including to the greatest extent possible, substantially equalizing the temperature distribution across its wall thickness by causing it to reside in a suitable environment capable of influencing its temperature, such as for example a mold 22 and at times a core 30, or other environments known in the art, to avoid a layer-wise pattern of properties in the finished article corresponding to the known relationship between such properties and the deformation temperatures. This procedure is described in more detail in my U.S. Pat. No. 4,116,606. Thus, for example, one can form parison 16 by injection molding, rapidly cool said parison by heat exchange with core 15 and mold 10 which will result in a rapid cycle, but will also produce said unequal temperature distribution, followed by substantially equalizing the cross-sectional temperature distribution of said parison in for example mold 22, all in a controlled manner, to impose thereon the temperature profile desired for orientation. Naturally, the parison remains in mold 22 until the necessary desired temperature distribution adjustment is obtained. Alternatively, in accordance with the present invention, a previously formed, relatively cold parison may be placed in a heater which may be a radiant heater or a mold 10, heated rapidly therein, as by heat exchange with mold 10 and core 15, which is also apt to produce said unequal temperature distribution, and further treated in mold 22 by heat exchange with mold 22 and core 30, if used, to substantially equalize the temperature distribution of said parison. The foregoing provides the considerable advantages of enabling the attainment of a predetermined temperature profile of the parison resulting in optimum conditions for orientation without excessive dwell time in the molds. The parison mold is freed for further use while the first mold is completing the conditioning of the parison, resulting in an expeditious processing cycle.

After the formation of parison 16 in the assembly consisting of mold 10, core 15 and neck mold 20, the parison is left therein to cool in contact with the said elements of said assembly, each of which may be temperature controlled independently of each other, as shown. As a preferred procedure, the temperatures of the said elements will be so controlled as to cool the outside and the neck of the parison to a relatively low temperature, usually well below that suitable for orientation and the inside thereof, i.e., the side influenced by the temperature of core 15, to a temperature close to the orientation temperature, the composite of such cooling resulting in the removal of approximately that amount of heat which will leave the parison with the heat content corresponding to the desired average orientation temperature, albeit with an unequal cross-sectional distribution thereof, as above. Passage 27 is provided within core 15 communicating with an outside source of pressure fluid (not shown) and may terminate at a valve-like, closeable portion of the core. Core 15 is cooled, as indicated hereinabove, to provide cooling of the adjacent parison surfaces usually to a temperature near the orientation temperature but not to the low temperature needed for separation of the core 15 therefrom by conventional means. Mold 10 may be maintained at a lower temperature than core 15 to assure rapid removal of heat from the parison. Separation of core 15 from parison 16 without damage to it is then rendered possible by air-pressure stripping of the parison from the core while leaving the neck mold engaged therewith, i.e., air pressure is introduced through passageway 27 into parison 16 while core 15 is removed therefrom and neck mold 20 remains engaged therewith. Preferably, the parison is left in mold 10 during such separation in order to prevent it from being damaged by the air pressure so introduced. The neck mold 20 with parison 16 engaged thereon is then separated from mold 10 by positioning the assembly as shown in phantom in FIG. 3. As above described, it is now necessary to adjust the temperature of the parison. To that end, for example, a mold 22 or another known tempering device may be aligned with the parison. As here shown, mold 22 is laterally reciprocable by suitable mechanical means, as by motive means shown schematically in FIG. 1, into and out of alignment with the neck mold 20 and parison 16, and parison 16 is deposited in mold 22, by neck mold 20 as shown in FIG. 3 by the axial reciprocation of neck mold 20. Other means of engaging parisons and molds may be used, such as those described in the aforesaid parent applications and also those disclosed in U.S. Pat. Nos. 2,853,736, 2,974,362 and 3,944,643.

Mold 22 is a conditioning, i.e., tempering mold. It may operate by direct contact with the parison or by radiation, without such contact. It is frequently temperature controlled in multiple zones which may be disposed along the length thereof, as by heating or cooling elements 22a which are connected to appropriate heat transfer sources (not shown). It is a question of design convenience whether mold 22 and parison 16 are aligned by lateral or circular reciprocation of neck mold 20 or by other means.

If aligned by means of neck mold 20, the latter may then be freed from the parison. Mold 22 may be aligned with core 30 and neck mold 20, or if more convenient a second neck mold 37, and core 30 engaged with parison 16 in mold 22 as shown in FIG. 2 as by relative movement of the core and neck mold assemblies. If desired, parison 16 may be placed in better conformance with mold 22 by the exertion of fluid pressure within the parison, as through pressure line 38. A second core, e.g., a stretch-blow core 30, may be inserted into the parison.

As in the embodiment illustrated in FIG. 3, parison 16, which is retained within mold 22, may be transferred into alignment with a second core 30 which is carried by platen 31 and which may be provided with temperature control means. If axial stretching of the parison is desired, core 30 may include a stretch and blow assembly which comprises a mandrel extension 32 which is reciprocable as indicated by the arrow in FIG. 1 to axially extend the parison 16. An actuating means is shown which comprises a push rod 34 which engages extension 32, and which is connected to a piston 35 housed within a cylinder 36 which may, for example, be responsive to hydraulic pressure exerted by a pump, not shown. By controlling the flow of fluid into cylinder 36, the speed of piston 35 and therefore of the movable portion of core 30 may be controlled to stretch the parison at the speed best suited for the temperature of the parison. Such actuating means is merely illustrative of one manner of operation, as other actuating means known in the art can be employed herein. If a highly oriented article is not desired, the axial extension operation may be dispensed with.

Alternatively, core 30 may serve merely to influence the inside temperature of the parison, or it may be omitted altogether.

For the final forming sequence, the parison is separated from mold 22 by retaining it at the neck region in neck mold 20 or 37 on core 30. If parison 16 is retained on core 30, a close fit of core 30 within the neck of the parison is to be maintained.

In the embodiment shown in FIG. 3, core 30 is situated in spaced relationship to core 15, and mold 22 is situated in spaced relationship to a second mold 23, to enable both cores to engage a respective mold when core 15 and neck mold 20 are aligned with mold 22. Alternative alignments, as by means of the neck molds, may be used, so long as the concurrent pursuit of both the tempering and final forming processes with separate parisons may be accomplished. Further, and with regard to the transfer of parison 16, it should be noted that parison die 10 is spaced from mold 22, as illustrated in FIGS. 1 and 2, so that core 15 and neck mold 20 or another equivalent neck mold may engage with die 10 to form another parison while core 30 engages with mold 22 and also while a third core 41 may be used to eject the fully expanded article 40. The ability to concurrently conduct the various operations of the process outlined herein comprises one of the notable advantages of the invention. The simultaneous formation, transfer, or final expansion and finished article removal of a plurality of parts is envisioned in accordance with the present invention.

A fluid passageway 38 is provided and terminates at the end surface of that portion of the core 30 which does not move during the movement of extension 32. Alternatively, a fluid passageway similar to that shown on core 15 may be employed. Fluid passageway 38 also connects to a source of fluid under pressure, not shown. Accordingly, fluid may enter the space inside parison 16 during final expansion, discussed hereinafter, once passageway 38 is opened by movement of the extension 32 and correspondingly of the movable portion of core 30. If the transfer of the parison out of mold 22 is to be facilitated by gripping the parison from the inside as shown in the aforesaid copending U.S. patent application Ser. No. 911,359, an elastic sleeve may be provided adjacent the neck portion of the parison pressurized from its inside surface by means of pressure air through a secondary passageway causing the sleeve to expand against the inner half of the parison neck.

It can be seen that core 30 may be heated or cooled. Thus, the temperature of parison 16 may be adjusted by heat exchange between both the inner and outer surfaces of parison 16 and the corresponding mold and core surfaces thereby accelerating processing of parison 16 by axial extension and final expansion. Whenever core 30 may be made to conform to the inside contours of parison 16, the heat transfer conditions may be further improved over the ones prevailing if only the outer surface of parison 16 is in heat transfer relation with a corresponding mold element. Naturally, the conventional temperature regulators that are used to control the heating means of core 30 and mold 22 are able to do so individually, in several zones within the assembly, corresponding to the desired temperature profile.

Referring to FIG. 2 as one embodiment, the transfer of parison 16 to mold 23 may be conducted by core 30 which is in engagement with mold 22 and parison 16. Accordingly, core 30 with parison 16 thereon is separated from mold 22 as, for example, by the motive means shown schematically in FIG. 1. Upon release, core 30 with parison 16 thereon returns to the position illustrated in FIG. 1 and depicted in phantom in FIG. 3.

As can be seen in FIGS. 1 and 2, a third core or article removal plug 41 may be provided for removing the finished article and may be positioned in lateral spaced relationship to second core 30. When the second core engages parison 16 in mold 22, the removal plug 41 engages the finished article 40 in mold 23. As shown by the arrows, the second and third cores are axially and laterally reciprocable so that the second core transfers parison 16 from mold 22 to mold 23 by a combination of axial, lateral and axial movements. Simultaneously, third core 41 removes the finished article from mold 23, which may be split and separable to facilitate the extraction of the finished article, and transfers same to an ejection station located laterally of mold 23 (not shown) for removal of the finished article while core 30 engages mold 23.

Parison 16 is then received in mold 23, with its temperature having been adjusted as described above. Parison 16 is usually axially extended to the bottom of mold 23 by the advancement of the movable portion of mandrel 32 by means of push rod 34 at a predetermined rate. Thus, the present invention may controllably stretch the parison longitudinally before final blowing and thereby produce orientation in the axial direction as well as the orientation subsequently produced by blowing. It can be seen that the temperature of the parison preparatory to stretching and blowing may be properly and conveniently controlled by the respective tempering environment and core. While stretching occurs, passageway 38 is kept open to provide pressure equalization of the inside of the parison with the atmosphere to prevent collapse of the parison due to the vacuum created inside it as its inside volume increases during stretching.

The parison is fully expanded to conform to the configuration of finishing mold 23, to form the final object 40 which, in the embodiment illustrated herein, is an open-ended container. Naturally, a wide variety of shapes may be prepared as the commercially known shapes which may be a bottle, a jar or a cup-shape. Full expansion is accomplished by supplying fluid under pressure through passageway 38 into the interior of parison 16, or at times and at various rates, into the interior of the parison while it is being extended.

In the embodiment illustrated herein, finishing mold 23 is longitudinally split into two sections labeled 42 and 43, which may reciprocate in and out of communication by an actuating means, not shown, such as for example a hydraulic cylinder. Thus, sections 42 and 43 may be parted an amount sufficient to permit the removal of article 40 by core 41 which may be inserted into the neck thereof with a tight fit. Prior to such opening of mold 23 and removal, fluid pressure may be applied through passageway 46 to continue the blowing process, if desired, in cases requiring continued contact of article 40 with second mold 23 for the purpose of extended cooling. Alternatively, passageway 46 may be utilized to continue to supply cooling air to the inside of the finished article, or to apply suction to the inside of the finished article to aid in retaining same thereon.

Thus, it can be seen that the present invention improves the injection blow molding process and carries out the steps of parison production, stretch orientation and circumferential orientation in a controlled sequence. The parison is injected or provided in a first station, the core removed therefrom and the parison is moved from the first station on the neck mold. The parison is then transferred by the neck mold into a tempering mold. The tempering mold is then used to retain the parison therein until it is ready to be inserted into the finishing mold, in engagement with a stretch-blow mandrel. The finished article may be ejected by a third or ejection core.

The process of the present invention is simple, convenient and progressive in nature and obtains a very rapid operating cycle. The parison moves from the injection mold to tempering mold; from tempering mold to a finishing mold, and out.

The temperature adjustment of the parison afforded by the present invention has been found to provide an oriented product having consistently good properties using economical operating cycles. The parison is injected into a temperature controlled mold and left there for a very short time, long enough to remove approximately the amount of heat from the parison that corresponds to the condition best suited for orientation. The core may be maintained at an elevated temperature without impeding its separation from the parison, resulting in a rapid operating cycle. Core removal is facilitated by air pressure stripping and maintaining neck mold engagement with the parison.

The parison is then transferred into a tempering mold which imparts the optimum orientation temperature distribution to the given plastic article, staying in that mold long enough to equalize the temperature across the wall thickness of the parison which naturally arrives from the injection mold with a poor cross-sectional temperature profile. After tempering, the parison, now having the right temperature profile with good cross-sectional distribution, is transferred into a cooled finishing mold in which it is stretched at a controlled rate and blown. The steps of injection plus dwell in the injection mold; of tempering and of stretch-blowing with cooling; and of article removal, may occur at the same time.

Naturally, many variations may be included. Injected or blown necks may be made.

In one modification, the parison may be formed earlier at a time and location of its own and stored before being formed into the final article. In addition to injection molding, numerous methods are known that may be employed to provide thermoplastics in the shape of a parison, such as tube extrusion with welding of one open end, dipping, deposition, thermoforming and the like. Thus, the previously formed parison may be transported to and placed upon a first blow core which cooperates with a heating means to raise the temperature of the parison sufficiently to enable it to undergo deformation.

Figure 4:
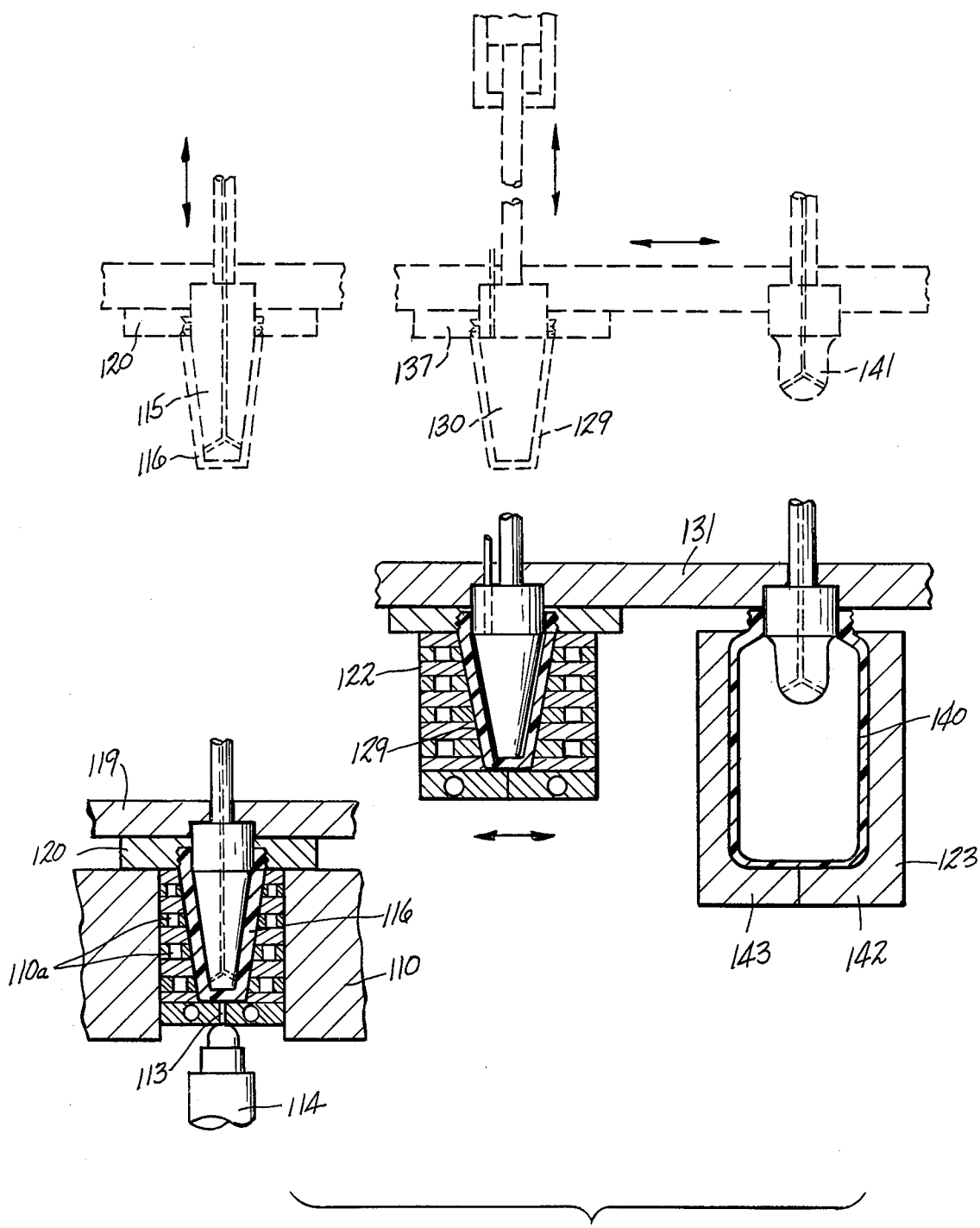
FIG. 4 is an elevated view, partly in section, illustrating an alternate method according to the present invention.

In accordance with the modification shown in FIG. 4, one may separate the parison from a blow core at the tempering mold in accordance with the improved process of the present invention. Thus, the parison 116 may be formed in parison die 110 in a manner after FIGS. 1, 2 and 3 and the parison transferred to tempering die 122 by means of core 115 and neck mold 120. Tempering die is moved laterally into alignment with core 115 and the core with parison 116 thereon moved axially to place the parison in mold 122, also in a manner after FIGS. 1, 2 and 3. If desired, parison 116 may be slightly expanded by core 115 to form a pre-expanded parison 129 in order to facilitate removal of core 115 therefrom and also to place the parison into better engagement with the mold walls. Core 115 may then be removed from the parison 129 at the tempering mold with air stripping in accordance with the present invention and with the neck mold remaining engaged with the parison to insure that the parison remains in place. The neck mold is then released, mold 122 containing parison 129 therein moved laterally into alignment with core 130 and the parison processed as in FIGS. 1, 2 and 3.

Thus, it can be readily seen that the process of the present invention is versatile and highly advantageous. The improved method for separating the core from the parison may be utilized in the parison die or in the tempering mold, with highly improved results, including accurate temperature control and an expeditious processing cycle. The process of the present invention avoids the necessity for inordinate cooling of the parison prior to removal of the core, with attendant slower processing cycle.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a method for temperature conditioning an organic plastic parison for the operation of multi-axial orientation such as by stretching and expanding, the improvement which comprises: providing said parison at an elevated temperature above that required for orientation of said plastic; retaining and cooling said parison in a first mold assembly which includes a first mold, a mold cavity, a neck mold and a core, wherein said first mold and first core are maintained at temperatures below that required for orientation, but said first mold is maintained at a lower temperature than said core to assure rapid removal of heat from said parison; separating said core from said parison while retaining and cooling said parison in said first mold wherein separation of said parison and said core is effected by applying positive fluid pressure inside said parison while said separation of the core is taking place and thereby facilitating removal of the core from the parison and avoiding the formation of a vacuum inside the parison during said separation; separating said parison and said first mold from each other after a substantial change in the heat content of said parison will have taken place, wherein the heat content of said parison is altered by means of heat exchange with said core and mold to result substantially in the heat content of the parison having an average temperature suited for orientation, wherein said altering is effected at temperature gradients adapted for rapid heat flow and with an unequal distribution of temperature resulting across the walls of the parison; and locating the parison in an environment capable of influencing the cross-sectional temperature distribution in the walls of said parison, with said locating facilitated by said neck mold, wherein the temperature of the outside surface of said parison is lower than the temperature of its inside surface at the time said parison is located in said environment, and equalizing the temperature distribution of the parison in said environment without substantially altering the heat content of said parison to attain a temperature substantially corresponding to the orientation temperature.

2. A method according to claim 1 wherein said pressure is conducted through a channel located within said core.

3. A method according to claim 5 wherein said channel is closeable.

4. A method according to claim 1 wherein said environment is comprised of a mold having a cavity substantially conforming to the outside contour of said parison.

5. A method according to claim 1 wherein said environment comprises elements in close proximity but not in contact with the outside surface of said parison.

6. A method according to claim 1 wherein the temperature of said environment is controllable in at least one zone.

7. A method according to claim 1 wherein said environment includes a second core capable of being positioned within said parison and capable of influencing the temperature of said parison.

8. A method according to claim 7 wherein the temperature of said second core is controllable.

9. A method according to claim 1 including the steps of axially extending said parison and fully expanding said parison to provide a final article which is multi-axially oriented.

10. A method according to claim 1 wherein said neck mold is maintained in engagement with said parison while said separation of the core is taking place.

11. A method according to claim 1 including the steps of: providing an organic plastic parison in a formable condition at a temperature substantially above that required for orientation of said plastic in said mold assembly containing individually temperature controllable elements; altering the heat content of said parison by heat exchange with said mold assembly; interrupting said heat exchange with said core by separating said parison and core from each other with the aid of fluid pressure applied inside said parison through said core, such separation occurring while the parison remains in heat exchange contact with said first mold and neck mold; separating said parison from said first mold after separation of the parison from the core; and transferring said parison into said environment.

12. A method according to claim 11 wherein said parison is separated from said first mold by means of said neck mold.

13. A method according to claim 11 wherein said environment includes a second mold and wherein said transfer is effected by means of the neck mold.

* * * * *

UNITED STATES PATENT AND TRADEMARK OFFICE
CERTIFICATE OF CORRECTION

PATENT NO. : 4,242,300
DATED : December 30, 1980
INVENTOR(S) : Emery I. Valyi

It is certified that error appears in the above-identified patent and that said Letters Patent are hereby corrected as shown below:

In Column 5, line 19, after "organic" change "plate" to read ---plastic---.

In Column 5, line 57, after "casting" insert ---,---.

In Column 12, line 67, claim 3, change "claim 5" to read ---claim 2---.

*Signed and Sealed this*

*Tenth* Day of *March 1981*

[SEAL]

*Attest:*

RENE D. TEGTMEYER

*Attesting Officer*  *Acting Commissioner of Patents and Trademarks*